May 30, 1939.  L. E. LA BRIE  2,160,074
EQUALIZING MEANS FOR HYDRAULIC BRAKES
Filed Aug. 1, 1935  3 Sheets-Sheet 1
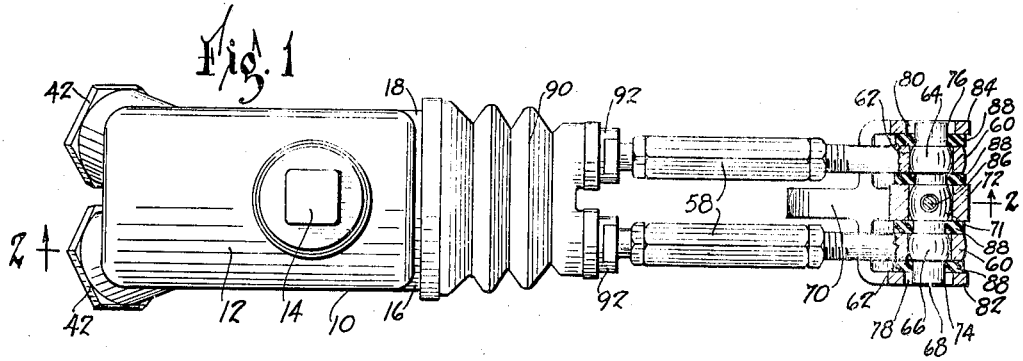
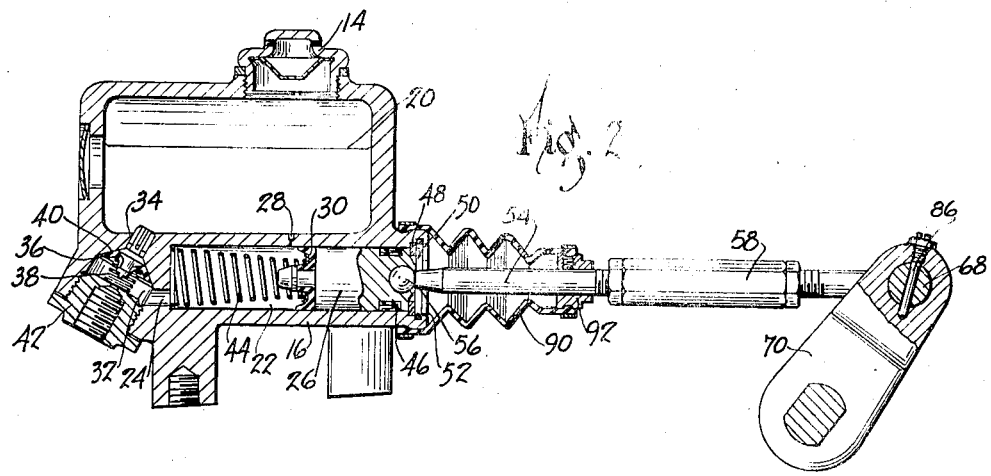
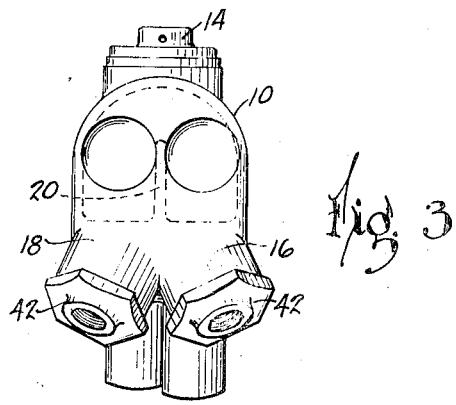
INVENTOR.
LUDGER E. LA BRIE
BY
H. P. Keiper
ATTORNEY.

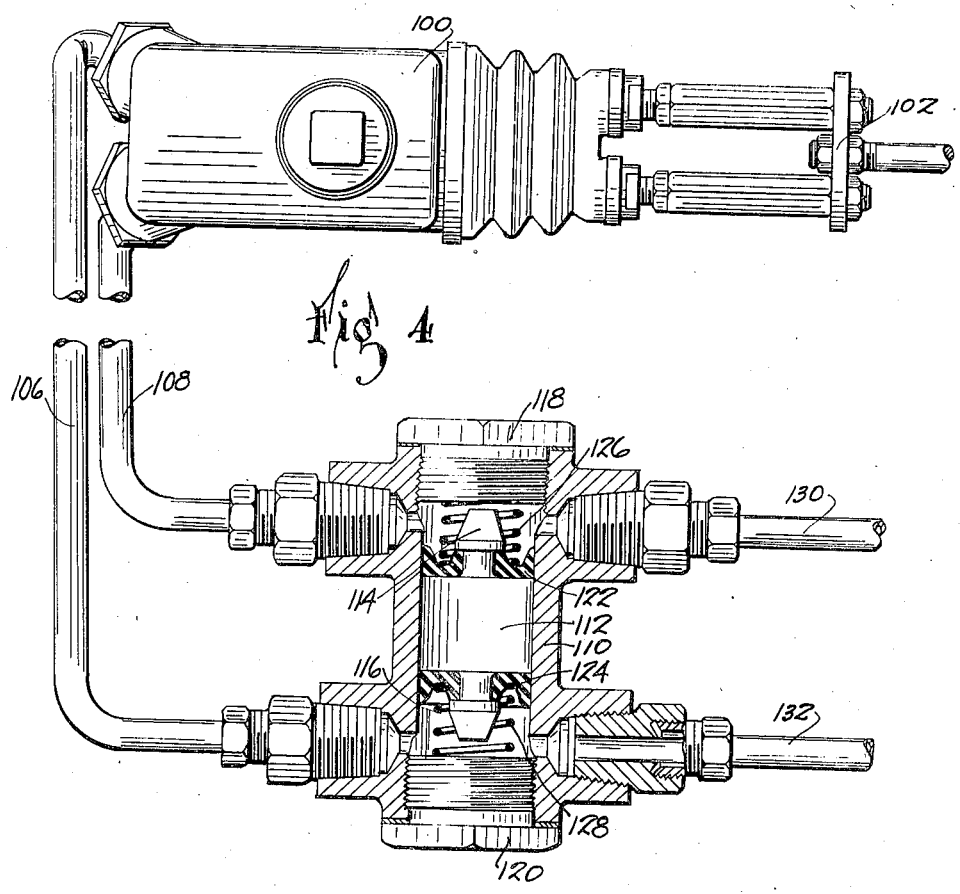
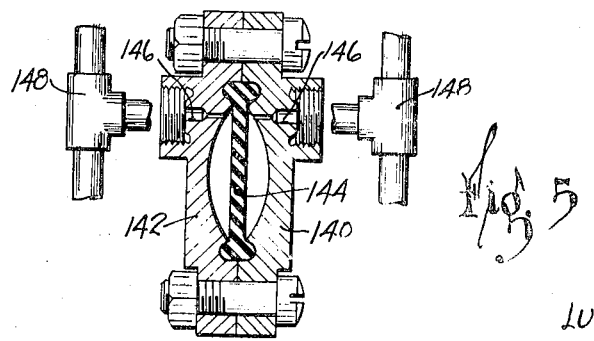

May 30, 1939.  L. E. LA BRIE  2,160,074
EQUALIZING MEANS FOR HYDRAULIC BRAKES
Filed Aug. 1, 1935  3 Sheets-Sheet 3
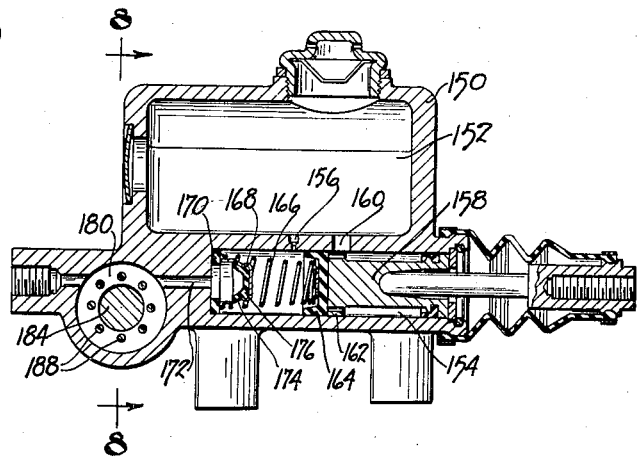
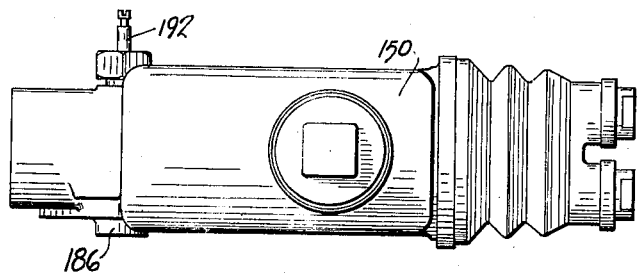
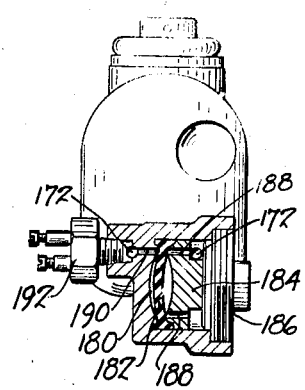
INVENTOR.
LUDGER E. LeBRIE
BY
ATTORNEY.

Patented May 30, 1939

2,160,074

UNITED STATES PATENT OFFICE 2,160,074

EQUALIZING MEANS FOR HYDRAULIC BRAKES

Ludger E. La Brie, South Bend, Ind., assignor to Bendix Products Corporation, South Bend, Ind., a corporation of Indiana Application August 1, 1935, Serial No. 34,162

5 Claims. (Cl. 60—54.5)

This invention relates to hydraulic brake systems and more particularly to master cylinders therefor.

In the usual hydraulic braking system employed on automotive vehicles, it has been found advantageous to split the system into two independent systems and divide the wheel brake cylinders therebetween in order to protect against possible failure. Such a construction tends to destroy the inherent equalization of such systems and this invention is directed to means for retaining the equalization feature in a dual system, without thereby destroying the safety.

An object of the invention is therefore to provide in a dual hydraulic brake system a means for providing equalization between the systems without destroying the safety thereof.

Other objects of the invention have to do with the accomplishing of the foregoing in a safe, simple and efficient manner.

The above and other objects and novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Fig. 1 is a top plan view of a master cylinder showing one modification of the invention;

Fig. 2 is a section taken on the line 2—2 of Fig. 1 showing the cylinder construction;

Fig. 3 is an end view of the master cylinder;

Fig. 4 is a top plan view of a dual master cylinder with an equalizing device shown in section, the same being a modified form of the invention;

Fig. 5 shows a modified equalizing device in section for substitution in the combination of Fig. 4;

Fig. 6 is a section thru another form of master cylinder combining the parts of the modification of Fig. 4 in a unit;

Fig. 7 is a top plan view of Fig. 6; and

Fig. 8 is an end view of Fig. 6, the equalizer being shown in section taken on the line 8—8 of Fig. 6.

Referring to the drawings and more particularly Figs. 1–3 thereof, there will appear a master cylinder casing 10, having a reservoir 12 with a filler plug 14, and a pair of parallel cylinders 16 and 18 located thereunder, the reservoir having a longitudinal partition 20 therein. Each of the master cylinders are similar, comprising a bore 22 having a discharge port 24 at one end and a piston 26 normally at rest at the other. A compensating port 28 between the reservoir and each cylinder is provided just forward of the annular cup washer 30 carried on the forward face of each piston.

Each discharge port is provided with an enlarged opening 32 and a port 34 leading directly into the reservoir 12, the latter port however being provided with a suitable check valve 36 which is seated by a spring 38 tensioned between the check valve washer 40 and an annular plug 42. Each piston is provided with a return spring 44 and a rear cup packing 46, and its rearward movement is limited by a stop washer 48 and lock ring 50 arranged in an annular enlargement 52 of the cylinder bore adjacent the end thereof.

Piston rods 54 having a ball and socket connection 56 with the rear of the pistons are provided with an adjusting sleeve 58, and an eye piece 60 at the end thereof. The eye pieces preferably have a true cylindrical bore 62 therethru which is adapted to receive spherical portion 64 and 66 of a transverse equalizing lever 68. A forked lever 70 having three apertured blades is interleaved around the eye pieces 60 and the equalizing lever 68 which functions much as a pin, passes thru the apertures and eyes and secures the parts in operating relationship.

The lever 68 is provided with a spherical central enlargement, 71, adapted to rock in the center blade 72, of the forked lever, and the ends 74 and 76 of the lever loosely fit in the apertures 78 and 80 of the outside blades 82 and 84, fixing a limit upon the amount of equalizing action that can be accommodated by the lever. A pin 86 fixes the equalizing pin against axial movement, and washers 88 of rubber or other suitable material are provided between the forked lever and the rod eyes.

A common flexible bellows covering 90 is provided over the cylinder ends and secured to collars 92 on the piston rods 54.

In Fig. 4 there is shown a dual master cylinder 100 wherein both pistons are rigidly connected as at 102 so that both must operate simultaneously. The internal structure thereof may be similar to that of Fig. 1. In order to equalize pressures between the two systems the pipe lines 106 and 108 are connected to opposite ends of a cylinder 110 which contains a piston partition 112 having a limited equalizing movement.

The piston is provided with knobs 114 and 116 adapted to engage the end plugs 118 and 120 on extreme movement, and each end of the piston is provided with an annular cup washer 122 and 124 and centering springs 126 and 128. The conduits 130 and 132 extend on to the separate braking systems.

In Fig. 5 a modified diaphragm form is shown comprising a pair of shell members 140 and 142 with a diaphragm 144 secured therebetween. The portion of each shell facing the diaphragm is suitably recessed and a small port 146 is provided leading to each recess, the same being provided near the top to avoid difficulties encountered in bleeding. In practice each port 146 is connected to one of the separate braking systems thru T connections 148 thus providing for limited pressure equalization.

In Figs. 6, 7 and 8 is illustrated a dual master cylinder with an equalizing diaphragm chamber built thereinto. The same comprises a casing 150 having a divided reservoir 152 and cylinder bores 154 therebelow. The particular cylinder construction illustrated in this modification varies from the others in that a compensating port 156 is provided just forward of a spool type piston 158 and a filling passage 160 provided between cylinder and reservoir just behind the forward flange 162 of the spool piston. A cup washer 164 is secured in front of the piston by a spring 166 which also acts to seat a cup shaped valve member 168 seated on an annular washer 170 around the discharge port 172. The cup member is also provided with holes 174 in its side walls adapted to be covered by the rubber inner liner or cup 176, the side walls of this latter cup acting as flap valves on the holes 174. There is thus provided a double check valve offering a predetermined resistance to flow in either direction.

The cylinder discharge ports 172 lead into a transverse chamber 180 which is adapted to receive a flanged flexible diaphragm, 182, a stuffing block 184, all secured in place by a large threaded plug 186. The filler block 184 is provided with a series of ports 188 arranged on a circle in line with the port 190 leading from the left hand discharge port 172, so that the relative position of the block will not prevent bleeding. one or more ports 188 being always on top. A stop light switch 192 may be connected with the discharge port 172.

In the operation of the arrangement shown in Figures 1 to 3 inclusive pressure upon a foot pedal or other operating means connected to the lever 70 operates through the equalizing lever 68 to force the piston rods 58 forward, thus transmitting force to the pistons 26 and creating fluid pressure in both systems simultaneously. So long as no leakage occurs the equalizing lever 68 will permit a limited amount of variation of operation of the two systems and thus equalize the pressures therebetween. However, should a substantial leak occur in either system, one of the ends 74 and 76 of the equalizing lever will contact its associated aperture 78 or 80 and limit the amount of equalizing action that can be accommodated by the lever.

In the arrangement shown in Figure 4, pressure created by the operating means is transmitted through the yoke 102 and the piston rods to the pistons in the separate bores of the cylinder and thus creates pressure in the conduits 106 and 108. So long as these pressures are equal the piston 112 remains in the intermediate position shown. In the event that a higher pressure is developed in one system than in the other, the piston 112 moves under the influence of said higher pressure to equalize the pressures in the two systems. Should there be a substantial loss of fluid in one of the systems, the piston 112 will move until one of the abutments 114 contacts its associated plug 118 or 120, thus limiting the amount of equalization.

In the arrangements shown in Figures 5, 6, 7 and 8 operation of the operating means similarly operates the pistons in the two bores of the master cylinder and thus creates pressures in the conduits leading to the brakes. In Figure 5 this pressure in the conduits 148 is equalized by reason of the fact that both of the conduits 148 are connected through the ports 146 with the chamber formed between the shells 140 and 142. If there is greater pressure in one of the conduits than in the other, the diaphragm 144 will be moved to accommodate this difference in pressure and will thus equalize the pressures. In the event however that there is a substantial loss of liquid, the diaphragm 144 wil be moved into contact with the spherical surface of the chamber and prevent further equalization. Similarly the pressures created by the cylinder 150 in Figures 6, 7 and 8 in the two systems will be equalized by reason of the connections between each of the systems to the chamber 180 by means of the bores 172, 188 and 190. If there is a greater pressure developed in one system than in the other, the diaphragm 182 will be moved to equalize the pressures, but if there is a substantial loss of liquid in either system, the diaphragm 182 will be moved to seat on one or the other of the spherical surfaces of the chamber and prevent further equalization in the master cylinders in connection with the discharge ports are for the purpose of preventing the return stroke of the master piston from producing vacuum in the line, and forcing the master piston to temporarily withdraw fluid from the reservoir on the return stroke, until, the wheel cylinders force the liquid back into the cylinder and reservoir.

There are thus provided means for equalizing the pressures in dual hydraulic brake systems, which means is reliable and does not destroy the safety features of a dual system.

Although several embodiments or modifications of the invention have been illustrated and described, it is to be understood that the invention is not limited thereto but may be embodied in various other mechanical arrangements and forms. As various changes in construction and arrangement of the parts may be made without departing from the spirit of the invention, as will be apparent to those skilled in the art, reference will be had to the appended claims for a definition of the limits of the invention.

What is claimed is:

1. A dual master cylinder having two cylinder bores and pistons, a discharge port from each cylinder bore leading to an enlarged cylindrical chamber, a diaphragm in said chamber, a filler block filling said chamber, and a plug holding said diaphragm and block in position, said block having a plurality of ports therethru near the periphery thereof.

2. An equalizing chamber comprising a casing having a large bore therein, a diaphragm seated in said bore, a filler block filling said bore, and a plug in said bore holding the diaphragm and block in place, the face of said block facing said diaphragm and the face on the bottom of the bore being dished to provide a small chamber on either side of the diaphragm and ports leading to said chambers.

3. A fluid braking system comprising a pair of fluid pressure producing devices, a fluid pressure actuated motor connected to each device, means for actuating the devices in unison, a chamber having a concave bottom connected by a port to one of the devices and a port providing a communication between the chamber and the other device, a flexible diaphragm in the chamber and a plug in the chamber clamping the diaphragm in position, said plug having a circumferential groove registering with the port and a concave face oppositely disposed with relation to the concavity in the chamber and a plurality of spaced passages providing communications between the groove and the concavity in the plug.

4. A fluid braking system comprising a pair of fluid pressure producing devices, fluid pressure actuated motors connected to each device, means for actuating the devices in unison, a chamber having a concave bottom connected by a port to one of the devices, an annular groove surrounding the concavity and a port providing a communication between the chamber and the other device, a flexible diaphragm having a marginal ring seated in the groove, and a plug in the chamber having a groove registering with the groove in the chamber and receiving the marginal ring on the diaphragm, a concave face on the plug opposed to the concavity in the chamber, and a plurality of passages connecting the concavity in the chamber to a circumferential groove in the plug registering with the port.

5. In a fluid pressure system of the class described, the combination of a pair of fluid compressors, means for operating said compressors simultaneously, a fluid pressure operated motor connected to each compressor, a member providing a recess, a plug detachably secured to said member and providing an opposing recess, said recesses jointly forming a diaphragm chamber, a diaphragm clamped between said member and said plug, means establishing communication between one side of said diaphragm and one of said compressors and means comprising a passage and annular groove in said plug providing communication between the other side of said diaphragm and the other compressor.

LUDGER E. LA BRIE.